US012494594B2

(12) United States Patent
Kobayashi et al.

(10) Patent No.: US 12,494,594 B2
(45) Date of Patent: Dec. 9, 2025

(54) TERMINAL FITTING HOUSING UNIT WITH HEAT SINK PORTION

(71) Applicant: Yazaki Corporation, Tokyo (JP)

(72) Inventors: Naoki Kobayashi, Makinohara (JP); Masaki Tanaka, Makinohara (JP)

(73) Assignee: Yazaki Corporation, Tokyo (JP)

( * ) Notice: Subject to any disclaimer, the term of this patent is extended or adjusted under 35 U.S.C. 154(b) by 340 days.

(21) Appl. No.: 18/471,414

(22) Filed: Sep. 21, 2023

(65) Prior Publication Data

US 2024/0128663 A1 Apr. 18, 2024

(30) Foreign Application Priority Data

Oct. 12, 2022 (JP) ................................ 2022-164073

(51) Int. Cl.
*H01R 4/34* (2006.01)
*H01R 4/70* (2006.01)

(52) U.S. Cl.
CPC ................ *H01R 4/70* (2013.01); *H01R 4/34* (2013.01); *H01R 2201/26* (2013.01)

(58) Field of Classification Search
CPC . H01R 4/70; H01R 4/34; H01R 13/15; H05K 7/20509
See application file for complete search history.

(56) References Cited

U.S. PATENT DOCUMENTS 8,025,538 B2 * 9/2011 Hara ...................... H01R 43/22 439/723
8,100,730 B2 * 1/2012 Hara ...................... H01R 11/12 439/721
9,211,852 B2 * 12/2015 Omori ..................... B60R 16/02
9,362,665 B2 * 6/2016 Omori .................. H01R 31/085
9,716,363 B2 * 7/2017 Saitoh .................... H01R 43/24
9,761,978 B2 * 9/2017 Kim ....................... H01R 13/73
9,774,109 B2 * 9/2017 Tabata ..................... H01R 4/64
12,407,116 B2 * 9/2025 Tanaka ..................... H01R 4/30
2011/0111639 A1 5/2011 Hara et al.
2014/0235090 A1 8/2014 Omori et al.

FOREIGN PATENT DOCUMENTS

JP 2011-103193 A 5/2011
JP 2011-171252 A 9/2011
JP 2013-073911 A 4/2013

* cited by examiner

*Primary Examiner* — Vanessa Girardi
(74) *Attorney, Agent, or Firm* — Banner & Witcoff, Ltd.

(57) ABSTRACT

A housing unit includes a terminal fitting and a housing in which the terminal fitting is inserted into an accommodating chamber in a predetermined insertion direction and accommodated therein. The terminal fitting has a first terminal portion in which a plurality of first tab portions extend, a second terminal portion in which a plurality of second tab portions extend, a connecting portion connecting the first and second terminal portions, and a contact portion connected to a first tab coupling portion and to be connected to an external terminal, and is formed of a continuous conductor plate. The terminal fitting includes a heat sink portion extending from at least one of the connecting portion and a second tab coupling portion in a direction opposite to the insertion direction. At least a part of the heat sink portion is exposed to an outside of the housing.

2 Claims, 7 Drawing Sheets

TERMINAL FITTING HOUSING UNIT WITH HEAT SINK PORTION

CROSS-REFERENCE TO RELATED APPLICATIONS

This application is based on and claims priority under 35 USC 119 from Japanese Patent Application No. 2022-164073 filed on Oct. 12, 2022, the entire content of which is incorporated herein by reference.

TECHNICAL FIELD

The present invention relates to a housing unit including a terminal fitting having a plurality of tab portions provided thereon and a housing that accommodates the terminal fitting.

BACKGROUND ART

In the related art, a terminal fitting having a plurality of tab portions electrically connected to a mating terminal has been proposed. Since such a terminal fitting is generally manufactured by processing a continuous conductor plate, the terminal fitting is used as a joint terminal that connects a plurality of circuits or a ground terminal that grounds a plurality of circuits.

One of the related-art housing units accommodates this type of terminal fitting in an accommodating chamber of a housing, and uses the terminal fitting as a ground terminal. Specifically, a part of the terminal fitting is electrically connected to a predetermined ground point (for example, a body frame of an automobile), and a plurality of circuits that are connected to the mating terminal connected to the plurality of tab portions are collectively grounded (for example, see Patent Literature 1).

CITATION LIST

Patent Literature

Patent Literature 1: JP2013-073911A

SUMMARY OF INVENTION

In the above-described related-art housing unit, a spring-shaped contact of the mating terminal (a so-called female terminal) comes into elastic contact with the tab portion of the terminal fitting, so that the mating terminal and the tab portion are electrically connected. Here, in general, since the spring-shaped contact and the tab portion come into contact with each other by point contact or surface contact, a contact area between the spring-shaped contact and the tab portion is small, and a contact resistance value at a contact between the spring-shaped contact and the tab portion is large. Therefore, at the time of energization, the amount of heat generated due to Joule heat especially at the contact is large. Further, since the contact between the mating terminal and the tab portion is generally present in the accommodating chamber of the housing, it is difficult to efficiently release the heat generated at the contact to the outside of the housing.

As described above, the heat generated at the contact between the spring-shaped contact and the tab portion is transmitted to the spring-shaped contact, which may reduce an elastic force of the spring-shaped contact. In this case, a decrease in contact load between the spring-shaped contact and the tab portion at the contact further increases the contact resistance value at the contact. The increase in the contact resistance value at the contact can be a factor in lowering the reliability of the electrical connection between the mating terminal and the spring-shaped contact, and therefore it is desirable to prevent the increase in the contact resistance value as much as possible. In particular, when the terminal fitting includes a plurality of tab portions (that is, a plurality of contacts), it is considered that the increase in the total amount of heat generated by the entire terminal fitting further increases the chance that the reliability of the electrical connection described above is impaired.

An object of the present invention is to provide a housing unit capable of improving the reliability of electrical connection between a terminal fitting and a mating terminal.

In order to achieve the object described above, a housing unit according to the present invention is characterized as follows.

The housing unit of the present invention includes a terminal fitting and a housing. The terminal fitting includes a first terminal portion extending from a first tab coupling portion such that a plurality of first tab portions are arranged at intervals, a second terminal portion extending from a second tab coupling portion such that a plurality of second tab portions are arranged at intervals, a connecting portion connecting the first terminal portion and the second terminal portion, and a contact portion connected to the first tab coupling portion and to be connected to an external terminal. In the terminal fitting, the first terminal portion, the second terminal portion, the connecting portion, and the contact portion are formed of a continuous conductor plate. The housing has an accommodating chamber for accommodating the terminal fitting. The terminal fitting is inserted into the accommodating chamber in a predetermined insertion direction and accommodated therein. The terminal fitting includes a heat sink portion extending from at least one of the connecting portion and the second tab coupling portion in a direction opposite to the insertion direction, and at least a part of the heat sink portion is exposed to an outside of the accommodating chamber.

According to the housing unit in the present invention, a heat sink portion of the terminal fitting extends from at least one of a connecting portion of the terminal fitting and a second tab coupling portion in a direction opposite to an insertion direction of the terminal fitting into the housing. At least a part of the heat sink portion is exposed to the outside of the accommodating chamber of the housing. Accordingly, at the time of energization, heat generated at the contact between each of the plurality of first tab portions and the plurality of second tab portions and the mating terminal is transmitted to the heat sink portion through the terminal fitting itself, which is a continuous conductor plate, and is released from the heat sink portion to the outside of the accommodating chamber. As a result, it is possible to prevent an increase in the contact resistance value due to the heat generated at the contact between each tab portion and the terminal fitting as compared with the housing unit using the related-art terminal fitting without the heat sink portion. Therefore, the housing unit having the present configuration can improve the reliability of the electrical connection between the terminal fitting and the mating terminal.

The present invention has been briefly described above. Further, the details of the present invention will be further clarified by reading modes for carrying out the invention described below with reference to the accompanying drawings.

DESCRIPTION OF EMBODIMENTS

First Embodiment

Figure 1:
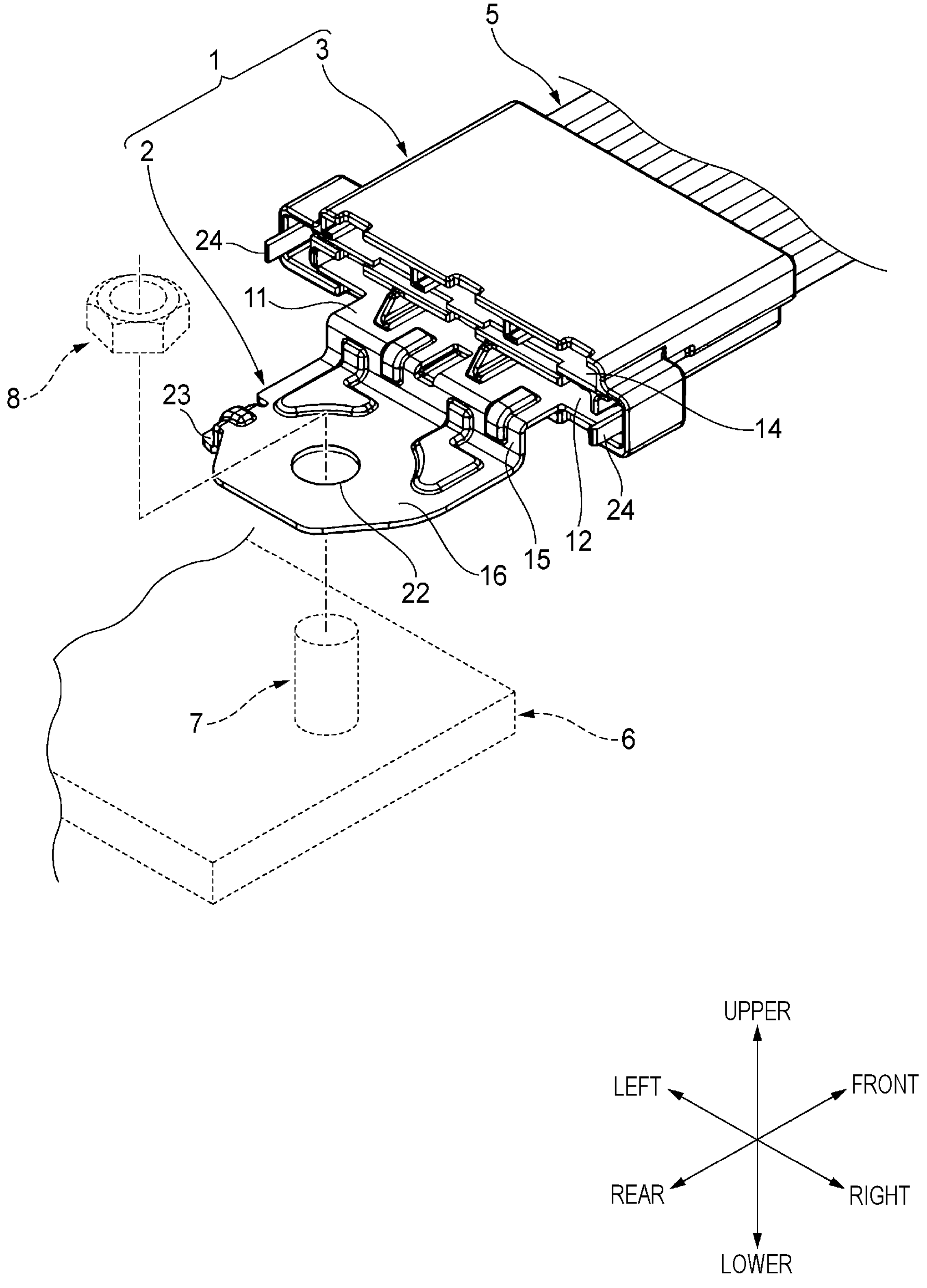
FIG. 1 is a perspective view showing a housing unit according to a first embodiment of the present invention.

Hereinafter, a housing unit 1 according to a first embodiment of the present invention will be described with reference to the drawings. Hereinafter, for convenience of description, as shown in FIGS. 1 to 7, "front", "rear", "left", "right", "upper", and "lower" are defined. A "front-rear direction", a "left-right direction", and an "upper-lower direction" are orthogonal to one another. The front-rear direction coincides with an attachment direction of a terminal fitting 2 to a housing 3 and an insertion direction of a mating terminal 4 (see FIG. 2) connected to an end of an electric wire 5 into the housing 3.

Figure 2:
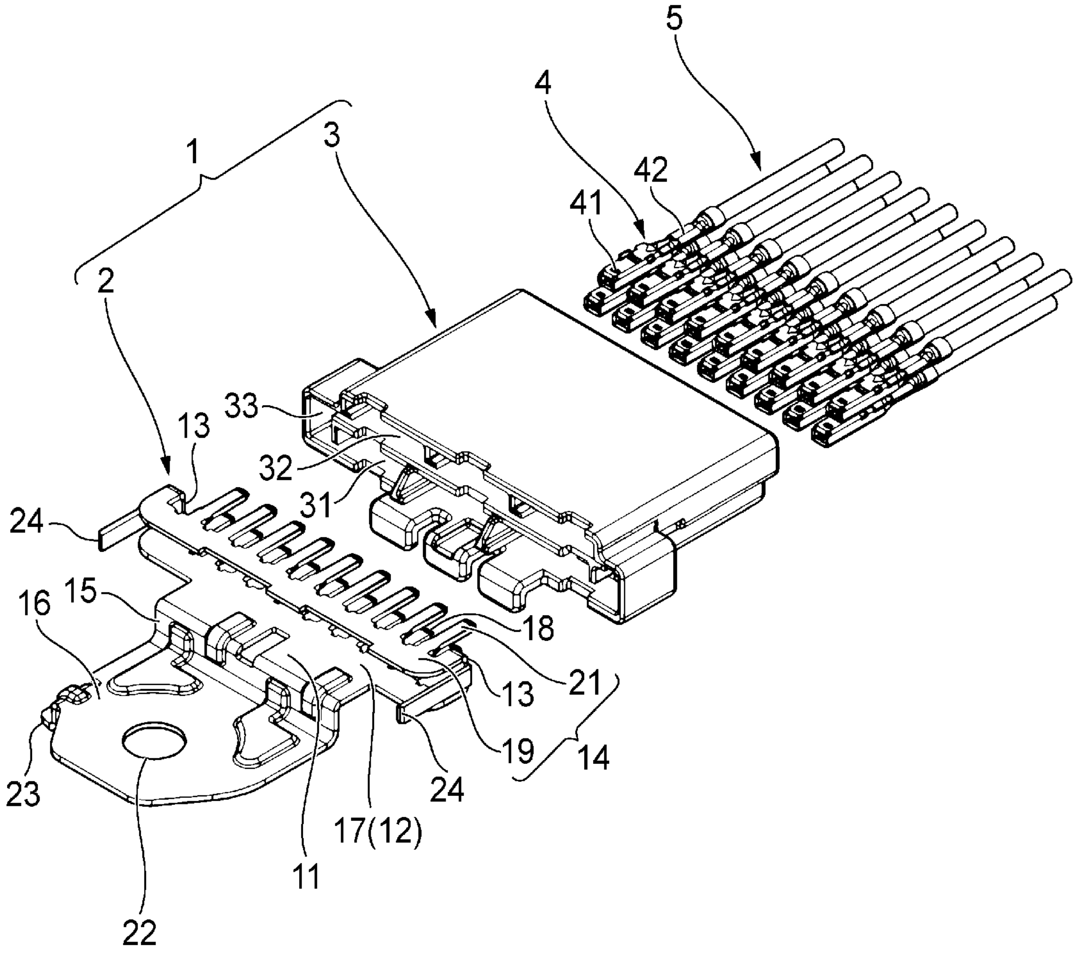
FIG. 2 is a perspective view showing a terminal fitting and a housing constituting the housing unit shown in FIG. 1 and a mating terminal connected to an electric wire.
Figure 2:
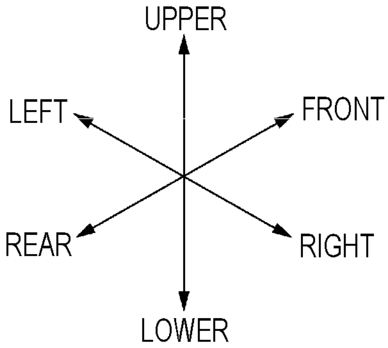

As shown in FIGS. 1 and 2, the housing unit 1 includes the terminal fitting 2 and the housing 3 to which the terminal fitting 2 is attached from a rear side. The terminal fitting 2 is electrically connected to a predetermined ground point 6 (see FIG. 1. For example, a body frame of an automobile), and a plurality of mating terminals 4 (see FIG. 2) connected to ends of a plurality of electric wires 5 are inserted into the housing 3 from a front side. Accordingly, the housing unit 1 has a function of collectively grounding the plurality of electric wires 5 (that is, a plurality of circuits) that are connected to the plurality of mating terminals 4 conductively connected to the terminal fitting 2. Hereinafter, members constituting the housing unit 1 will be described.

Figure 3:
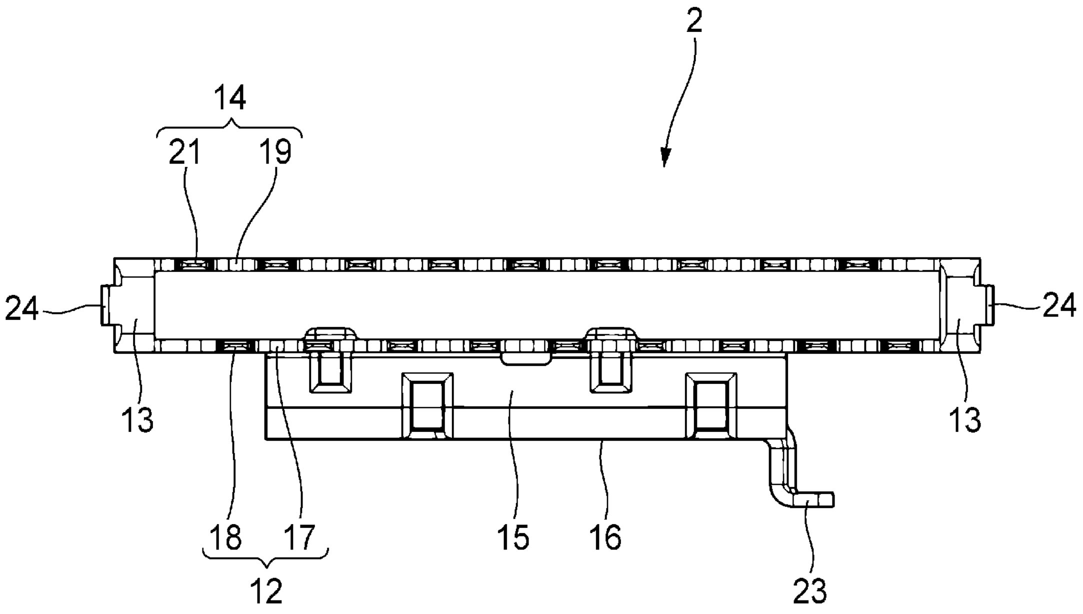
FIG. 3 is a front view of the terminal fitting shown in FIG. 2.
Figure 3:
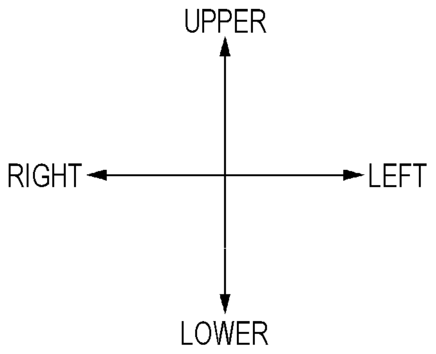

First, the terminal fitting 2 will be described. The terminal fitting 2 is formed by subjecting a preform to be described later obtained by punching a conductor plate having a flat plate shape to a predetermined bending process. As shown in FIGS. 2 and 3, the terminal fitting 2 has a three-dimensional shape integrally including a body portion 11 having a substantially rectangular flat plate shape elongated in the left-right direction, a first terminal portion 12 located on a front side of the body portion 11 and extending in the left-right direction, a pair of left and right connecting portions 13 extending upward from both left and right end portions of the first terminal portion 12, a second terminal portion 14 extending in the left-right direction in a manner of connecting upper end portions of the pair of left and right connecting portions 13, a stepped portion 15 that has a substantially rectangular flat plate shape elongated in the left-right direction and that extends downward from a rear end edge of the body portion 11, and a fixing portion 16 having a flat plate shape and extending rearward from a lower end edge of the stepped portion 15. The fixing portion 16 is formed with a through hole 22 penetrating therethrough in a plate thickness direction (the upper-lower direction). Further, a rotation preventing piece 23 is formed on a peripheral edge portion of the fixing portion 16 (see FIGS. 1 to 4). Functions of the through hole 22 and the rotation preventing piece 23 will be described later.

Left end portions of the first terminal portion 12 and the second terminal portion 14 are connected to each other by the left connecting portion 13, and right end portions of the first terminal portion 12 and the second terminal portion 14 are connected to each other by the right connecting portion 13. Accordingly, the first terminal portion 12 and the second terminal portion 14 are provided three-dimensionally in a manner of facing each other with a gap in the upper-lower direction and extending parallel to each other in the left-right direction.

As shown in FIGS. 2 and 3, the first terminal portion 12 includes a first tab coupling portion 17 that has a substantially rectangular flat plate shape elongated in the left-right direction and that is located on the front side of the body portion 11, and a plurality of first tab portions (male terminal portions) 18 that extend forward, with a certain interval in the left-right direction, from a front end edge of the first tab coupling portion 17 extending in the left-right direction. Similarly, the second terminal portion 14 includes a second tab coupling portion 19 that has a substantially rectangular flat plate shape elongated in the left-right direction and that is located on an upper side of the first tab coupling portion 17, and a plurality of second tab portions (male terminal portions) 21 that extend forward, with a certain interval in the left-right direction, from a front end edge of the second tab coupling portion 19 extending in the left-right direction. The plurality of first tab portions 18 and the plurality of second tab portions 21 are arranged in parallel to each other in the left-right direction at intervals in the upper-lower direction, and tips of the plurality of first tab portions 18 and tips of the plurality of second tab portions 21 are arranged at the same position in the front-rear direction. In the left-right direction, the first tab portion 18 is located between the second tab portions 21 adjacent to each other in the left-right direction, and the second tab portion 21 is located between the first tab portions 18 adjacent to each other in the left-right direction.

As shown in FIGS. 2 and 3, a pair of left and right elongated plate-shaped heat sink portions 24 extending rearward (in a direction different from the insertion direction of the terminal fitting 2 into the housing 3) are formed on left and right outer side end edges of the pair of left and right connecting portions 13. The operation and effect of providing the pair of left and right heat sink portions 24 will be described later.

Next, the housing 3 will be described. The housing 3 is a resin molded body, and as shown in FIG. 2, has a substantially rectangular cylindrical shape that is flat in the upper-lower direction and that extends in the front-rear direction. A first accommodating chamber 31 that accommodates the first terminal portion 12 (the plurality of first tab portions 18 and the first tab coupling portion 17) of the terminal fitting 2, a second accommodating chamber 32 that accommodates the second terminal portion 14 (the plurality of second tab portions 21 and the second tab coupling portion 19) of the terminal fitting 2, and a pair of left and right connecting portion accommodating chambers 33 that accommodate the pair of left and right connecting portions 13 of the terminal fitting 2 are defined in a hollow portion of the housing 3. The members constituting the housing unit 1 have been described above.

Figure 4:
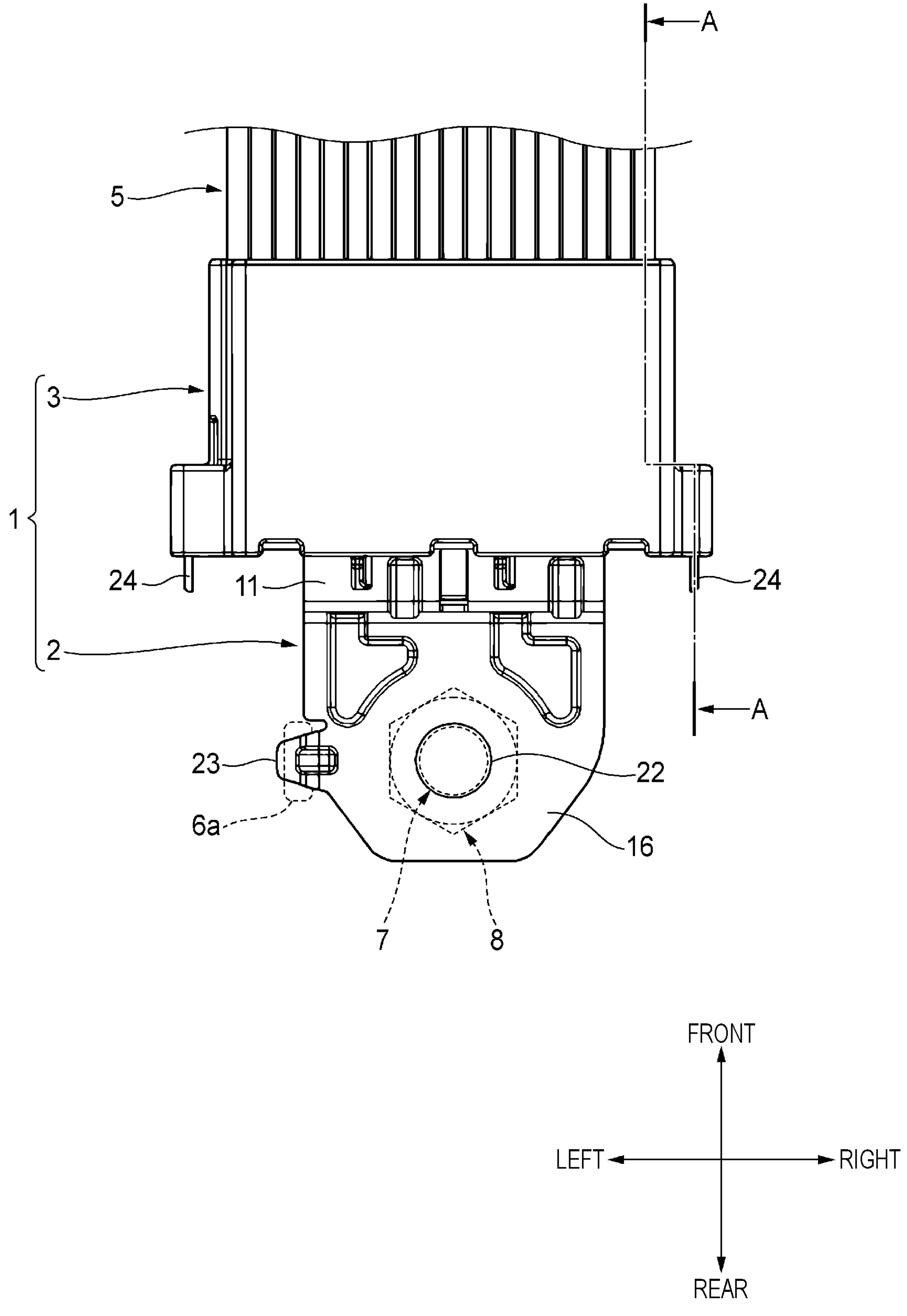
FIG. 4 is a top view of the housing unit shown in FIG. 1.

The housing unit 1 shown in FIG. 1 is obtained by inserting the terminal fitting 2 into the housing 3 from the rear side to the front side (that is, in the insertion direction). In an inserted state (an assembled state of the housing unit 1) of the terminal fitting 2 into the housing 3, the first terminal portion 12 of the terminal fitting 2 is accommodated in the first accommodating chamber 31 of the housing 3, the second terminal portion 14 of the terminal fitting 2 is accommodated in the second accommodating chamber 32 of the housing 3, and the pair of left and right connecting portions 13 of the terminal fitting 2 are accommodated in the pair of left and right connecting portion accommodating chambers 33 of the housing 3. As shown in FIGS. 1 and 4, rear ends of the pair of left and right heat sink portions 24 are located rearward of a rear end of the housing 3. Thus, rear end portions of the pair of left and right heat sink portions 24 are exposed to the outside of the housing 3.

Figure 5:
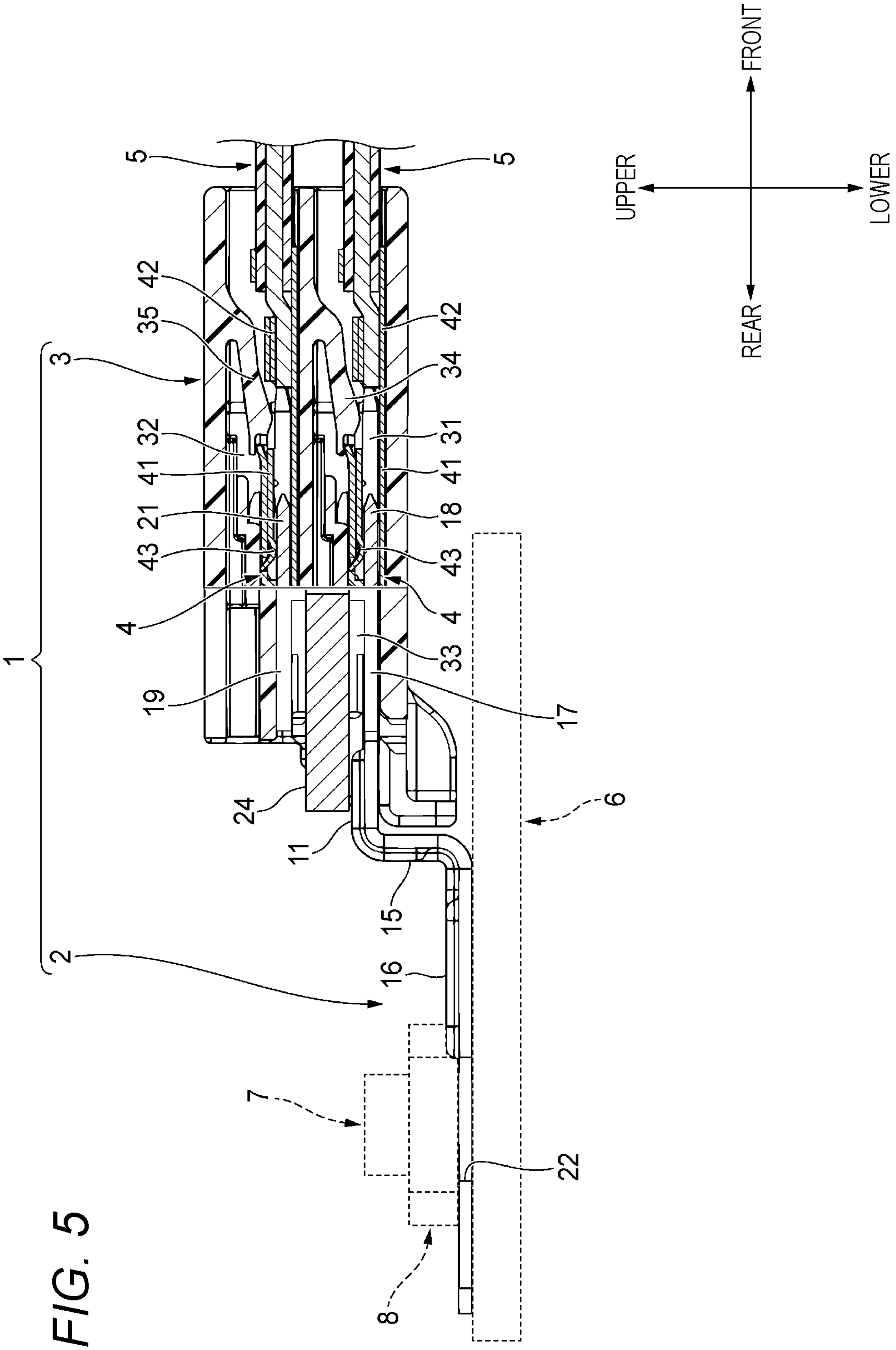
FIG. 5 is a cross-sectional view taken along a line A-A in FIG. 4.

As shown in FIGS. 1, 2, and 5, in the housing unit 1, a plurality of mating terminals (female terminals) 4 that are connected to the ends of the plurality of electric wires 5 and that are arranged in two rows in the left-right direction are inserted into the housing 3 from the front side and accommodated. As shown in FIGS. 2 and 5, the mating terminal 4 integrally includes a box-shaped female terminal portion 41 into which the first tab portion 18 or the second tab portion 21 of the terminal fitting 2 is to be inserted, and an electric wire connecting portion 42 connected to the end of the electric wire 5. A spring-shaped contact 43 is provided inside the female terminal portion 41 (see FIG. 5). The plurality of mating terminals 4 arranged in the lower row are accommodated in the first accommodating chamber 31 such that each spring-shaped contact 43 is in elastic contact with a corresponding one of the first tab portions 18, thereby being each electrically connected to a corresponding one of the plurality of first tab portions 18. Each of the plurality of mating terminals 4 accommodated in the first accommodating chamber 31 is engaged with a corresponding lance 34 (see FIG. 5) provided in the first accommodating chamber 31, thereby preventing forward detachment from the first accommodating chamber 31. The plurality of mating terminals 4 arranged in the upper row are accommodated in the second accommodating chamber 32 such that each spring-shaped contact 43 is in elastic contact with a corresponding one of the second tab portions 21, thereby being each electrically connected to a corresponding one of the plurality of second tab portions 21. Each of the plurality of mating terminals 4 accommodated in the second accommodating chamber 32 is engaged with a corresponding lance 35 (see FIG. 5) provided in the second accommodating chamber 32, thereby preventing forward detachment from the second accommodating chamber 32.

As shown in FIG. 1, the housing unit 1 to which the plurality of electric wires 5 are connected is fixed to the predetermined ground point 6 (such as a body frame of an automobile) by fastening the fixing portion 16 of the terminal fitting 2 to the ground point 6. For example, as shown in FIG. 1, the fixing portion 16 is fastened to the ground point 6 by inserting a stud bolt 7 provided on the ground point 6 into the through hole 22 of the fixing portion 16 and fastening a nut 8 to the stud bolt 7. During this fastening (tightening of the nut 8), the rotation preventing piece 23 provided on the fixing portion 16 engages with a locking hole **6*a* (see FIG. 8 and the like) formed at the ground point 6, thereby preventing so-called co-rotation of the fixing portion 16 (that is, the terminal fitting 2). Accordingly, the plurality of electric wires 5 (that is, a plurality of circuits) that are connected to the plurality of mating terminals 4 conductively connected to the terminal fitting 2** are collectively grounded.

As described above, in the housing unit 1 according to the first embodiment, the spring-shaped contact 43 of the mating terminal 4 is elastically brought into contact with the tab portion (the first tab portion 18 or the second tab portion 21) of the terminal fitting 2, so that the mating terminal 4 and the tab portion are electrically connected. Here, due to a small contact area between the spring-shaped contact 43 and the tab portion, the contact point between the spring-shaped contact 43 and the tab portion becomes hot due to Joule heat during energization. When an elastic force of the spring-shaped contact 43 decreases due to the heat generated at the contact, a contact load between the spring-shaped contact 43 and the tab portion decreases, and an electrical resistance value at the contact between the spring-shaped contact 43 and the tab portion is further increased. As a result, the reliability of the electrical connection between the mating terminal 4 and the spring-shaped contact 43 may be impaired. In particular, when a plurality of tab portions (that is, contacts) are present as in the terminal fitting 2, the total amount of heat generated by the entire terminal fitting 2 is increased, which may further increase the chance of impairing the reliability of the electrical connection described above.

In this respect, according to the terminal fitting 2 in the first embodiment, the pair of left and right heat sink portions 24 extend from the pair of left and right connecting portions 13 of the terminal fitting 2 in a direction (a rearward direction) opposite to the insertion direction of the terminal fitting 2 into the housing 3. The rear end portions of the pair of left and right heat sink portions 24 are exposed to the outside of the housing 3. Accordingly, when the housing unit 1 is energized, heat generated at the contact between each of the plurality of first tab portions 18 and the plurality of second tab portions 21 and the mating terminal 4 is transmitted to the pair of left and right heat sink portions 24 through the terminal fitting 2 itself, which is a continuous conductor plate, and is released to the outside of the housing 3 from the pair of left and right heat sink portions 24. As a result, it is possible to prevent an increase in contact resistance due to the heat generated at the contact between each tab portion (the first tab portion 18 or the second tab portion 21) and the terminal fitting 2 as compared with the housing unit using the related-art terminal fitting without the heat sink portion. Therefore, the housing unit 1 according to the first embodiment can improve the reliability of the electrical connection between the terminal fitting 2 and the mating terminal 4.

Second Embodiment

In the housing unit 1 according to the first embodiment described above, as the "heat sink portion" according to the present invention, the pair of left and right heat sink portions 24 extend from the pair of left and right connecting portions 13 of the terminal fitting 2 in the direction (the rearward direction) opposite to the insertion direction of the terminal fitting 2 into the housing 3 (see FIGS. 1 to 4).

Figure 7:
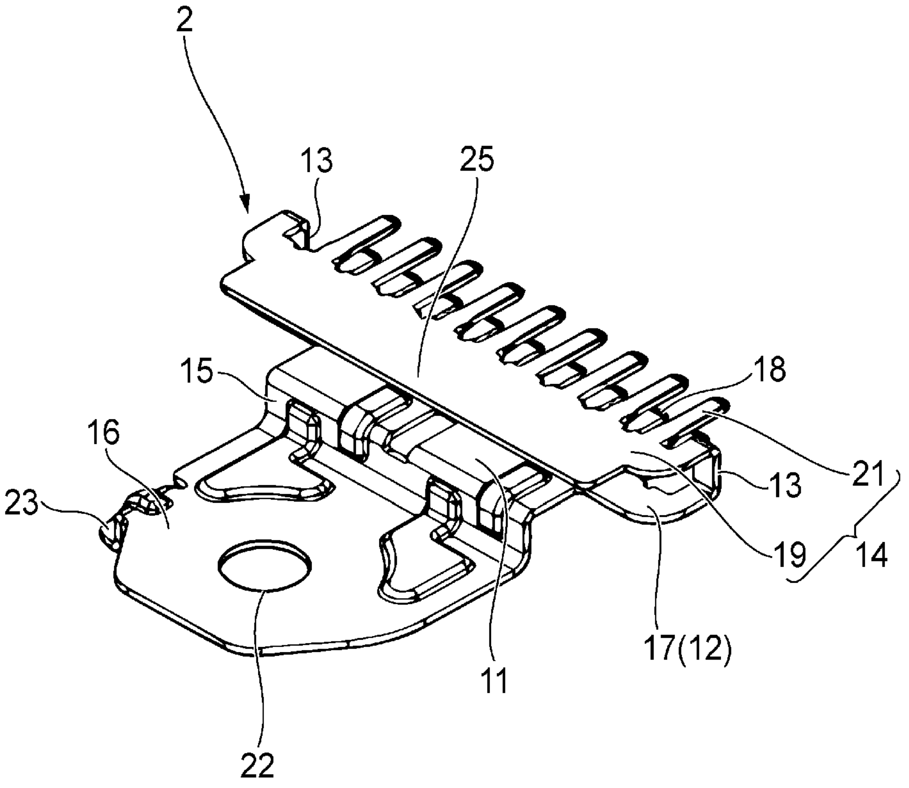
FIG. 7 is a perspective view of a terminal fitting shown in FIG. 6.
Figure 7:
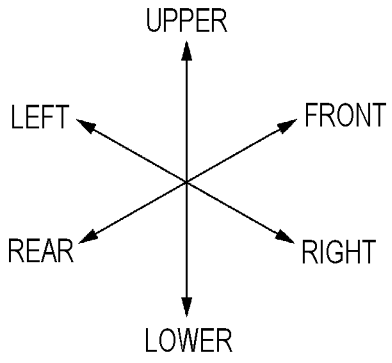

On the other hand, in the housing unit 1 according to the second embodiment, as shown in FIG. 7, as the "heat sink portion" according to the present invention, a single heat sink portion 25 having a flat plate shape and extending in the left-right direction extends from the second tab coupling portion 19 of the terminal fitting 2 in the direction (the rearward direction) different from the insertion direction of the terminal fitting 2 into the housing 3.

Figure 6:
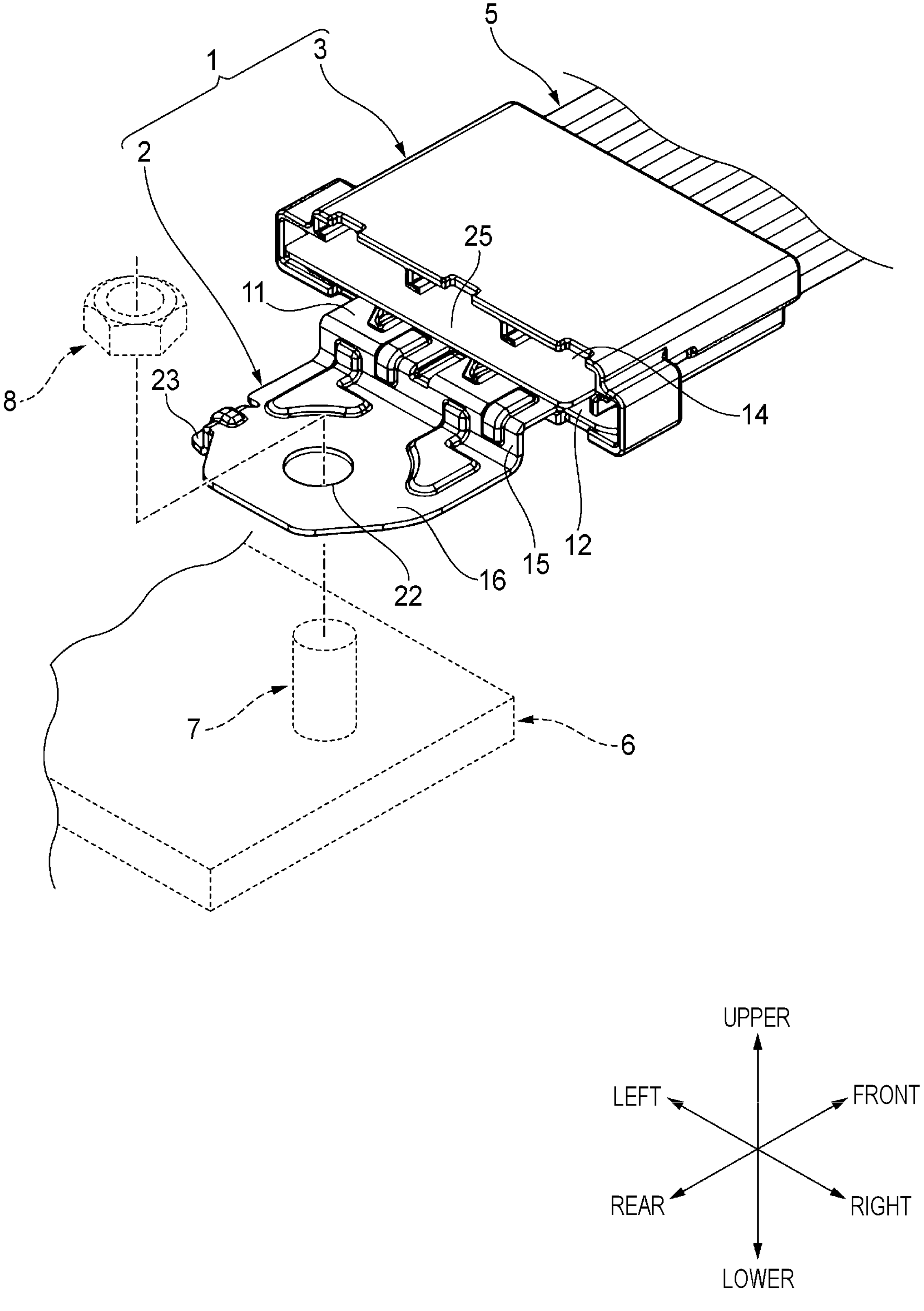
FIG. 6 is a view corresponding to FIG. 1 in a housing unit according to a second embodiment of the present invention.

As shown in FIG. 6, in the inserted state (the assembled complete state of the housing unit 1) of the terminal fitting 2 into the housing 3, a rear end of the heat sink portion 25 is located rearward of the rear end of the housing 3. That is, a rear end portion of the heat sink portion 25 is exposed to the outside of the housing 3. The heat sink portion 25 according to the second embodiment also has the same mechanism as the pair of left and right heat sink portions 24 according to the first embodiment. Accordingly, when the housing unit 1 is energized, the heat generated at the contact between each of the plurality of first tab portions 18 and the plurality of second tab portions 21 and the mating terminal 4 can be released to the outside of the housing 3. As a result, as in the first embodiment, the housing unit 1 according to the second embodiment can also improve the reliability of the electrical connection between the terminal fitting 2 and the mating terminal 4.

Other Embodiments

The present invention is not limited to the embodiments described above, and various modifications can be adopted within the scope of the present invention. For example, the present invention is not limited to the embodiments described above, and modifications, improvements, and the like can be made as appropriate. In addition, the material, shape, size, number, arrangement position, and the like of components in the embodiments described above are freely selected and are not limited as long as the present invention can be achieved.

In the first embodiment described above, in the terminal fitting 2, the pair of left and right heat sink portions 24 are provided on the pair of left and right connecting portions 13 of the terminal fitting 2, and the single heat sink portion 25 is not provided on the second tab coupling portion 19 of the terminal fitting 2. In the second embodiment described above, in the terminal fitting 2, the single heat sink portion 25 is provided on the second tab coupling portion 19 of the terminal fitting 2, and the pair of left and right heat sink portions 24 are not provided on the pair of left and right connecting portions 13 of the terminal fitting 2. Alternatively, in the terminal fitting 2, the pair of left and right heat sink portions 24 may be provided on the pair of left and right connecting portions 13 of the terminal fitting 2, and the single heat sink portion may be provided on the second tab coupling portion 19 of the terminal fitting 2.

In the embodiments described above, the left end portions of the first terminal portion 12 and the second terminal portion 14 are connected to each other by the left connecting portion 13, and the right end portions of the first terminal portion 12 and the second terminal portion 14 are connected to each other by the right connecting portion 13. Alternatively, either the left end portions or the right end portions of the first terminal portion 12 and the second terminal portion 14 may be connected to each other by the left connecting portion 13, the other of the left end portions and the right end portions of the first terminal portion 12 and the second terminal portion 14 may not be connected to each other, and each end portion may be a free end.

Here, the features of the embodiments of the housing unit 1 according to the present invention described above will be briefly summarized and listed in the following [1] and [2].

[1] A housing unit (1) including:

a terminal fitting (2) that includes a first terminal portion (12) extending from a first tab coupling portion (17) such that a plurality of first tab portions (18) are arranged at intervals, a second terminal portion (14) extending from a second tab coupling portion (19) such that a plurality of second tab portions (21) are arranged at intervals, a connecting portion (13) connecting the first terminal portion (12) and the second terminal portion (14), and a contact portion (16) connected to the first tab coupling portion (17) and to be connected to an external terminal (6), and in which the first terminal portion (12), the second terminal portion (14), the connecting portion (13), and the contact portion (16) are formed of a continuous conductor plate; and a housing (3) that has an accommodating chamber (31 to 33) for accommodating the terminal fitting (2), the terminal fitting (2) being inserted into the accommodating chamber (31 to 33) in a predetermined insertion direction and accommodated therein, in which the terminal fitting (2) includes a heat sink portion (24, 25) extending from at least one of the connecting portion (13) and the second tab coupling portion (19) in a direction opposite to the insertion direction, and in which at least a part of the heat sink portion (24, 25) is exposed to an outside of the accommodating chamber (31 to 33).

According to the housing unit having the configuration in [1] described above, a heat sink portion of the terminal fitting extends from at least one of a connecting portion of the terminal fitting and a second tab coupling portion in a direction different from an insertion direction of the terminal fitting into the housing. At least a part of the heat sink portion is exposed to the outside of the accommodating chamber of the housing. Accordingly, at the time of energization, heat generated at the contact between each of the plurality of first tab portions and the plurality of second tab portions and the mating terminal is transmitted to the heat sink portion through the terminal fitting itself, which is a continuous conductor plate, and is released from the heat sink portion to the outside of the accommodating chamber. As a result, it is possible to prevent an increase in the contact resistance value due to the heat generated at the contact between each tab portion and the terminal fitting as compared with the housing unit using the related-art terminal fitting without the heat sink portion. Therefore, the housing unit having the present configuration can improve the reliability of the electrical connection between the terminal fitting and the mating terminal.

[2] In the housing unit (1) according to [1] described above, the terminal fitting (2) includes a plurality of the heat sink portions (24).

According to the housing unit having the configuration in [2] described above, the terminal fitting includes a plurality of heat sink portions. Accordingly, heat generated at the contact between each of the plurality of first tab portions and the plurality of second tab portions and the mating terminal can be further efficiently released to the outside of the housing.

What is claimed is:

1. A housing unit comprising:

a terminal fitting that includes a first terminal portion extending from a first tab coupling portion such that a plurality of first tab portions are arranged at intervals, a second terminal portion extending from a second tab coupling portion such that a plurality of second tab portions are arranged at intervals, a connecting portion connecting the first terminal portion and the second terminal portion, and a contact portion connected to the first tab coupling portion and to be connected to an external terminal, and in which the first terminal portion, the second terminal portion, the connecting portion, and the contact portion are formed of a continuous conductor plate; and a housing that has an accommodating chamber for accommodating the terminal fitting, the terminal fitting being inserted into the accommodating chamber in a predetermined insertion direction and accommodated therein, wherein the terminal fitting includes a heat sink portion extending from at least one of the connecting portion and the second tab coupling portion in a direction opposite to the insertion direction, and wherein at least a part of the heat sink portion is exposed to an outside of the accommodating chamber.

2. The housing unit according to claim 1, wherein the terminal fitting includes a plurality of the heat sink portions.

* * * * *